US011938595B2

(12) United States Patent
Chen

(10) Patent No.: US 11,938,595 B2
(45) Date of Patent: Mar. 26, 2024

(54) FLEX HEAD TOOL

(71) Applicant: INFAR INDUSTRIAL CO., LTD., Chang-Hua County (TW)

(72) Inventor: Tai Hung Chen, Chang-Hua County (TW)

(73) Assignee: INFAR INDUSTRIAL CO., LTD., Chang-Hua County (TW)

( * ) Notice: Subject to any disclaimer, the term of this patent is extended or adjusted under 35 U.S.C. 154(b) by 14 days.

(21) Appl. No.: 17/550,059

(22) Filed: Dec. 14, 2021

(65) Prior Publication Data

US 2022/0226972 A1 Jul. 21, 2022

(30) Foreign Application Priority Data

Jan. 18, 2021 (TW) ................................ 110101809

(51) Int. Cl.
*B25B 23/00* (2006.01)

(52) U.S. Cl.
CPC ................................ *B25B 23/0028* (2013.01)

(58) Field of Classification Search
None
See application file for complete search history.

(56) References Cited

U.S. PATENT DOCUMENTS 5,768,960 A 6/1998 Archuleta
6,000,302 A * 12/1999 Chiang .................. B25G 1/063 81/177.8
6,848,345 B2 2/2005 Lin
6,957,600 B2 10/2005 Hu
7,000,507 B1 * 2/2006 Lin ........................ B25G 1/063 81/177.8
7,171,875 B2 2/2007 Hu
2001/0000092 A1 * 4/2001 Jarvis ..................... B25G 1/043 81/177.2
2015/0128770 A1 * 5/2015 Liu ........................ B25G 1/063 81/489
2016/0229039 A1 * 8/2016 Lee ....................... B25B 13/463
2017/0361434 A1 * 12/2017 Chien .................. B25B 13/461

FOREIGN PATENT DOCUMENTS

CN 215847913 U 2/2022
DE 102011002465 A1 7/2012
DE 202014103220 U1 11/2014
(Continued)

*Primary Examiner* — Bryan R Muller
*Assistant Examiner* — Dana Lee Poon
(74) *Attorney, Agent, or Firm* — MUNCY, GEISSLER, OLDS & LOWE, P.C.

(57) ABSTRACT

A flex head tool includes a first body and a second body and a. retaining device adapted to position the second body at various angular positions with respect to the first body. The retaining device includes a retainer and an actuator adapted to move the retainer in a first position and a second position. The retainer and the actuator respectively have a first interacting structure and a second interacting structure abutting each other. The second interacting structure has a first and a second position at which the first interacting structure respectively abuts when the actuator is at a first position and a second position. The first and the second positions of the second interacting structure are at different distances from the end of the actuator.

8 Claims, 7 Drawing Sheets

(56) References Cited

FOREIGN PATENT DOCUMENTS

| | | | |
|---|---|---|---|
| TW | M305734 | U | 2/2007 |
| TW | M376389 | U | 3/2010 |
| TW | I364346 | B | 5/2012 |
| TW | I389772 | B | 3/2013 |
| TW | I419768 | B | 12/2013 |

* cited by examiner

FLEX HEAD TOOL

BACKGROUND OF THE INVENTION

1. Field of the Invention

The present invention relates to a hand tool and, particularly, to a flex head tool.

2. Description of the Related Art

TW Pat. No. M305734 shows a flex head wrench which includes a swinging head positionable at various angles. The head has a positioning end which has a plurality of first engaging structures. The head is pivotally connected with a rod. The rod has two lugs and the head has an end pivotally connected with the lugs. A positioning device is adapted to retain the head with respect to the rod at various angular positions. The positioning device includes a pin defining a recess as well as a block forming a driven end and having a plurality of second engaging structures. The pin is movable between a lock position in which the driven end abuts on the recess at a first position such that the plurality of first and the plurality of second engaging structures are engaged with each other to prevent the head from moving with respect to the rod, and an unlock position in which the driven end abuts on the recess at a second position such that the plurality of first and the plurality of second engaging structures disengage from each other to allow the head to pivot with respect to the rod. The block, however, is likely to suffer defamation after a long use. Further, the pin does not support the block in retained positions stably.

The present invention is, therefore, intended to obviate or at least alleviate the problems encountered in the prior art.

SUMMARY OF THE INVENTION

According to the present invention, a flex head tool has a structure including a first body and a second body pivotally coupled to the first body. The first body defines a first orifice and a second orifice cooperatively receiving a retaining device which is adapted to position the first body with respect to the second body at various angular positions. The retaining device includes a retainer movably disposed in the first orifice and an actuator movably disposed in the second orifice. The second body has a first engaging structure and the retainer has a second engaging structure selectively engaging with different sections of the first engaging structure such that the first body is fixed with respect to the second body at different angular positions. The actuator abuts the retainer and is movable between a first position in which the first and the second engaging structure are engaged with each other and a second position in which the first and the second engaging structures are disengaged from each other thereby allowing the first and the second bodies move relative to each other. The retainer and the actuator respectively have a first interacting structure and a second interacting structure abutting each other. The second interacting structure is at an end of the actuator and has a first and a second position at which the first interacting structure respectively abuts when the actuator is at the first position and the second position. The first and the second positions of the second interacting structure are at different distances from the end of the actuator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
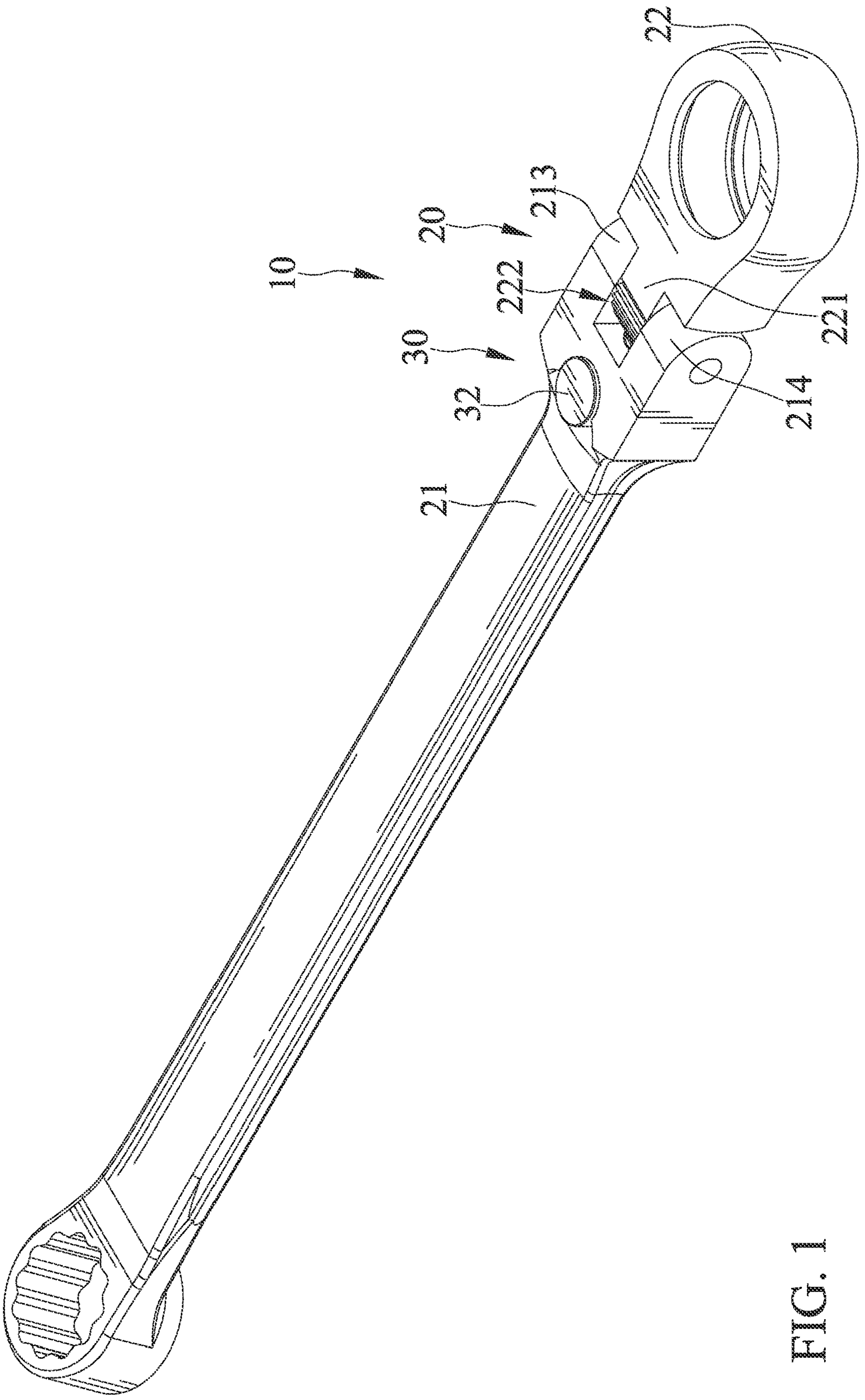
FIG. 1 is a perspective view of a flex head tool in accordance with the present invention.
Figure 2:
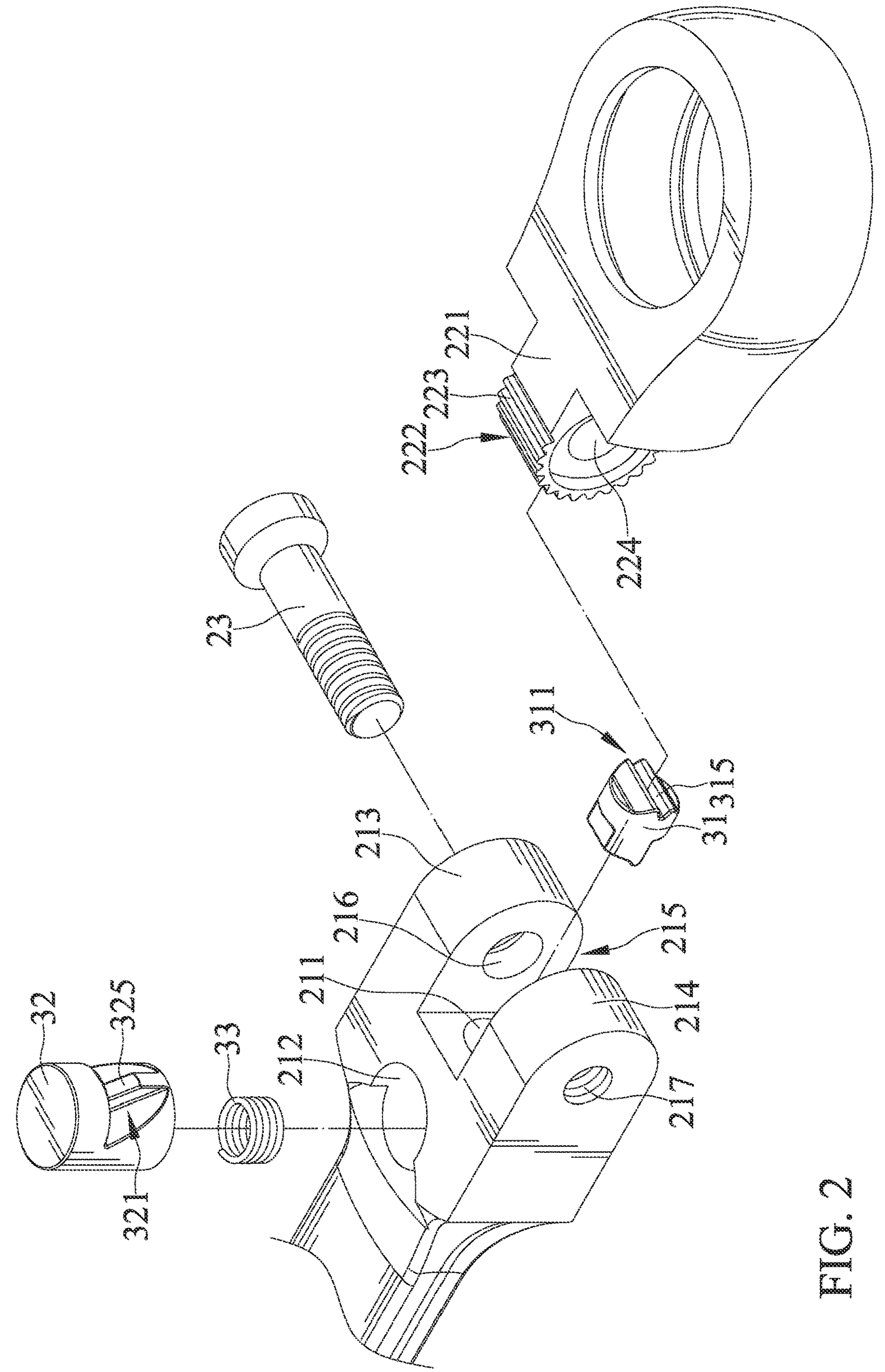
FIG. 2 is an exploded perspective view of the flex head tool of FIG. 1.
Figure 3:
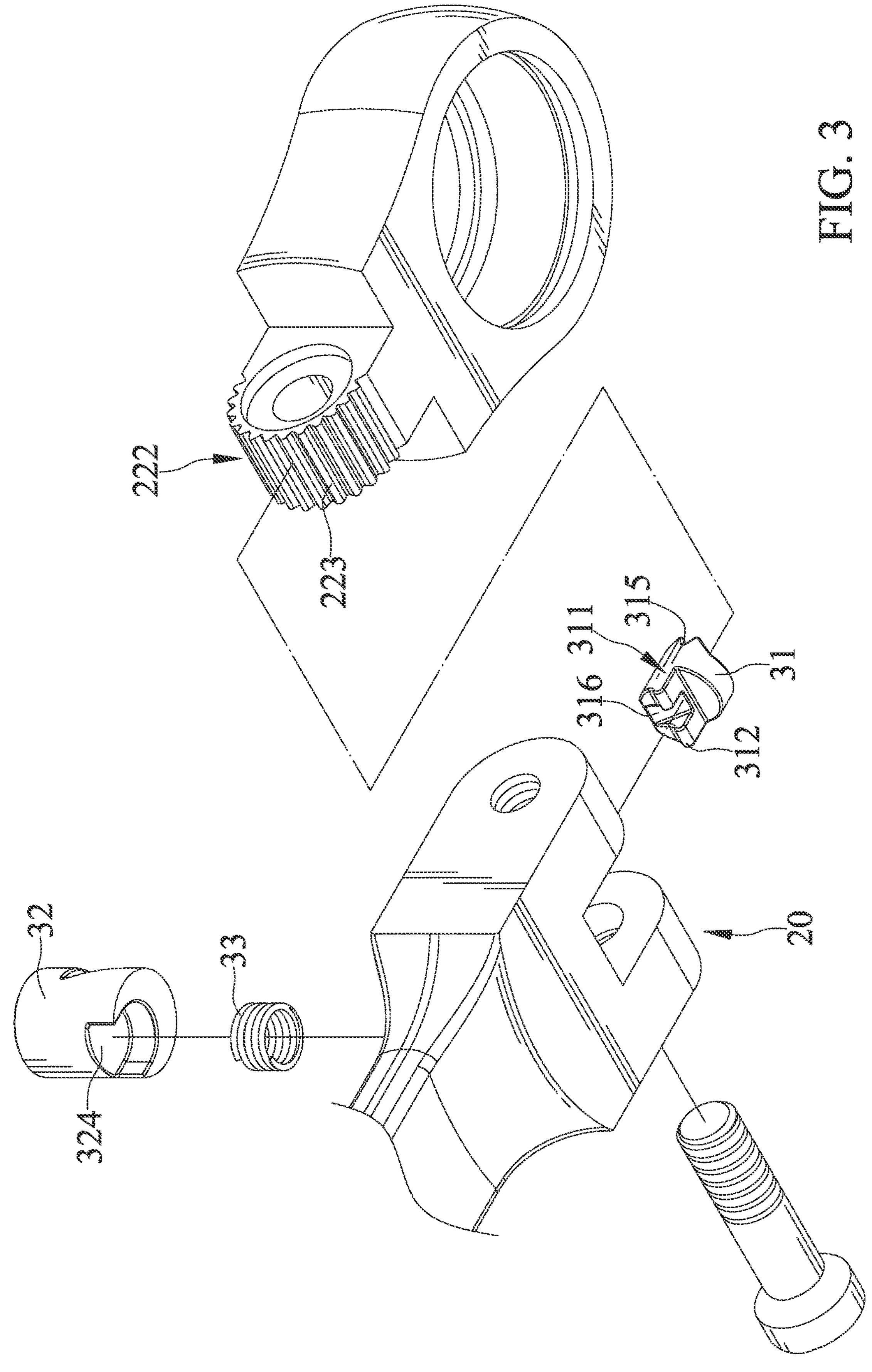
FIG. 3 is another exploded perspective view of the flex head tool of FIG. 1.
Figure 4:
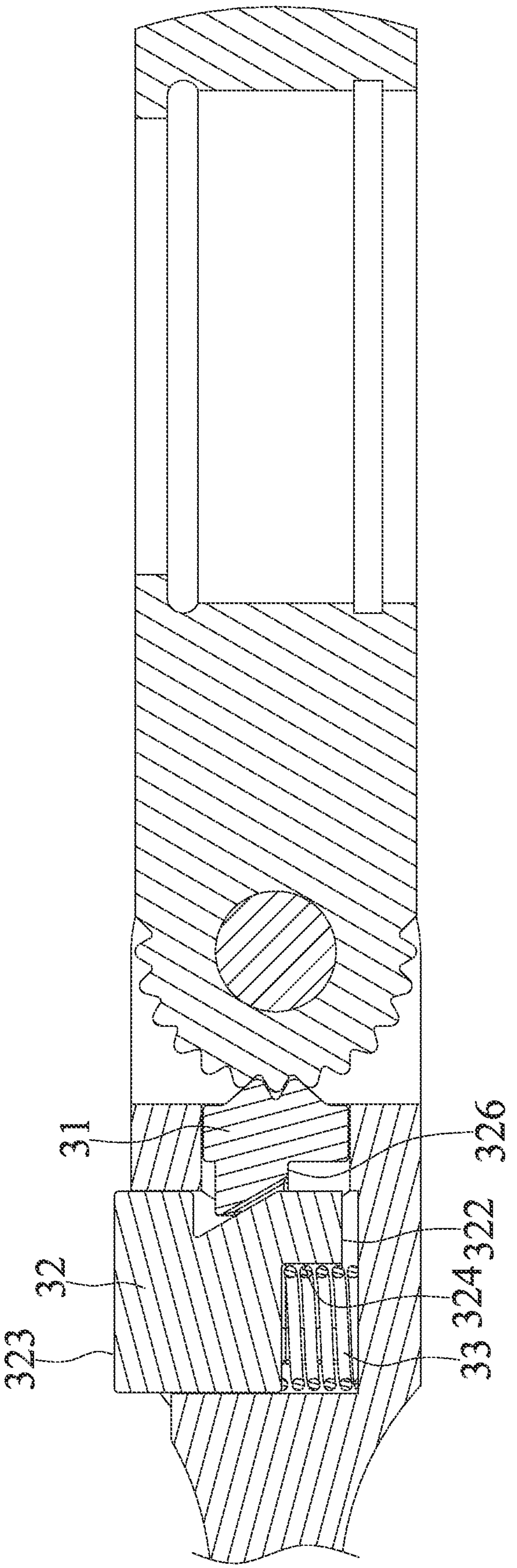
FIG. 4 is a cross-sectional view of the flex head tool of FIG. 1.
Figure 5:
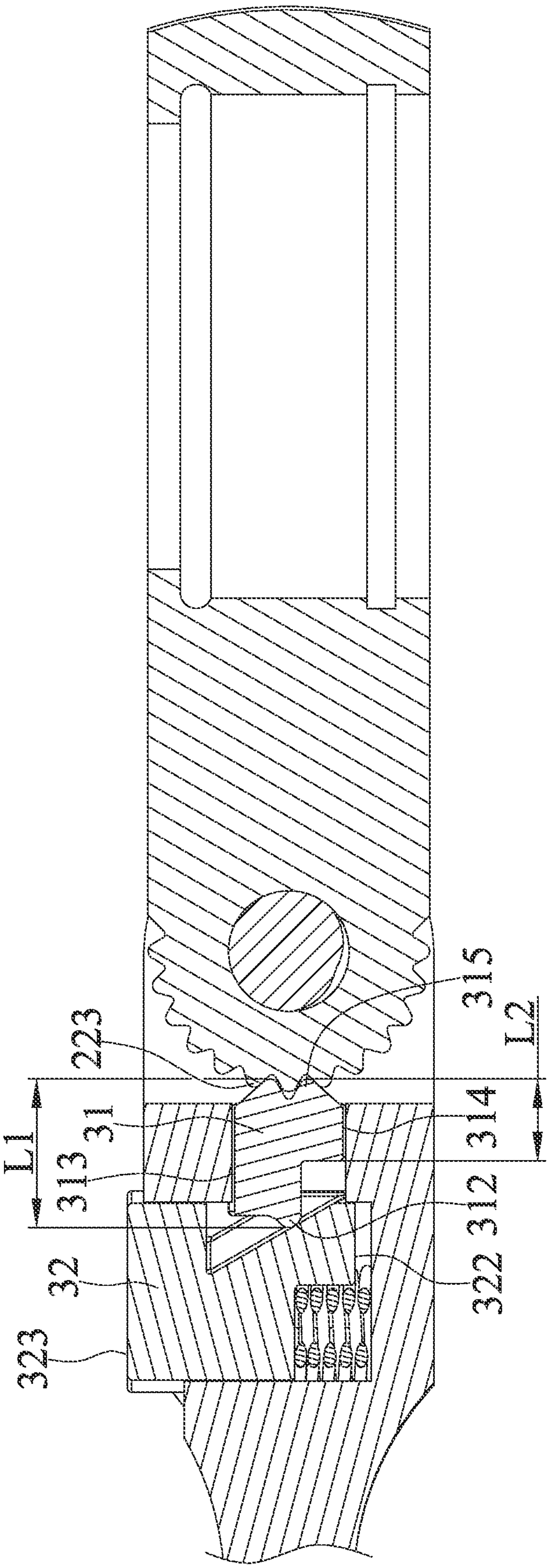
FIG. 5 is another cross-sectional view of the flex head tool of FIG. 1.
Figure 6:
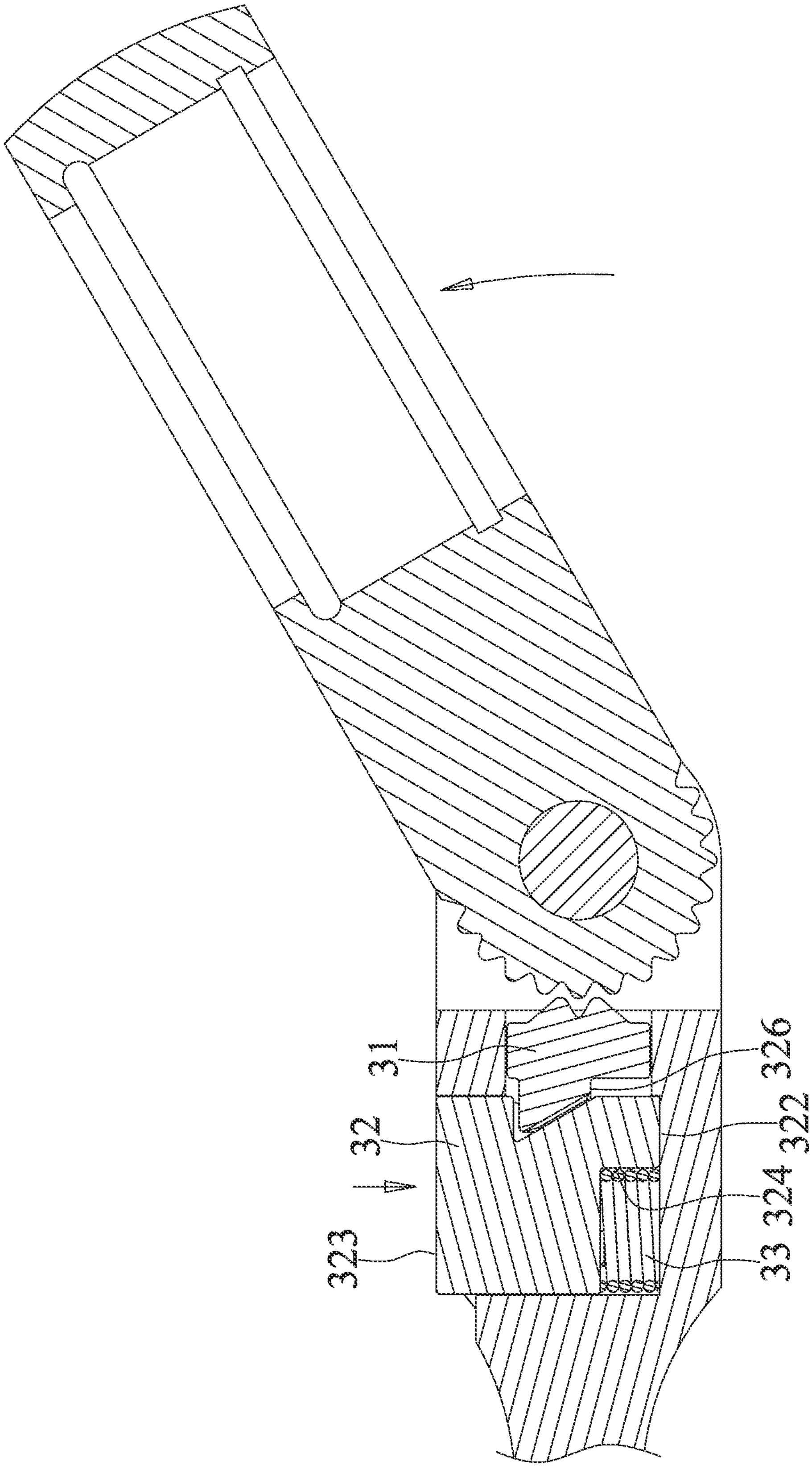
FIG. 6 is another cross-sectional view of the flex head tool of FIG. 1, with arrows illustrating the operation of adjusting an angular position of a head of the flex head tool.
Figure 7:
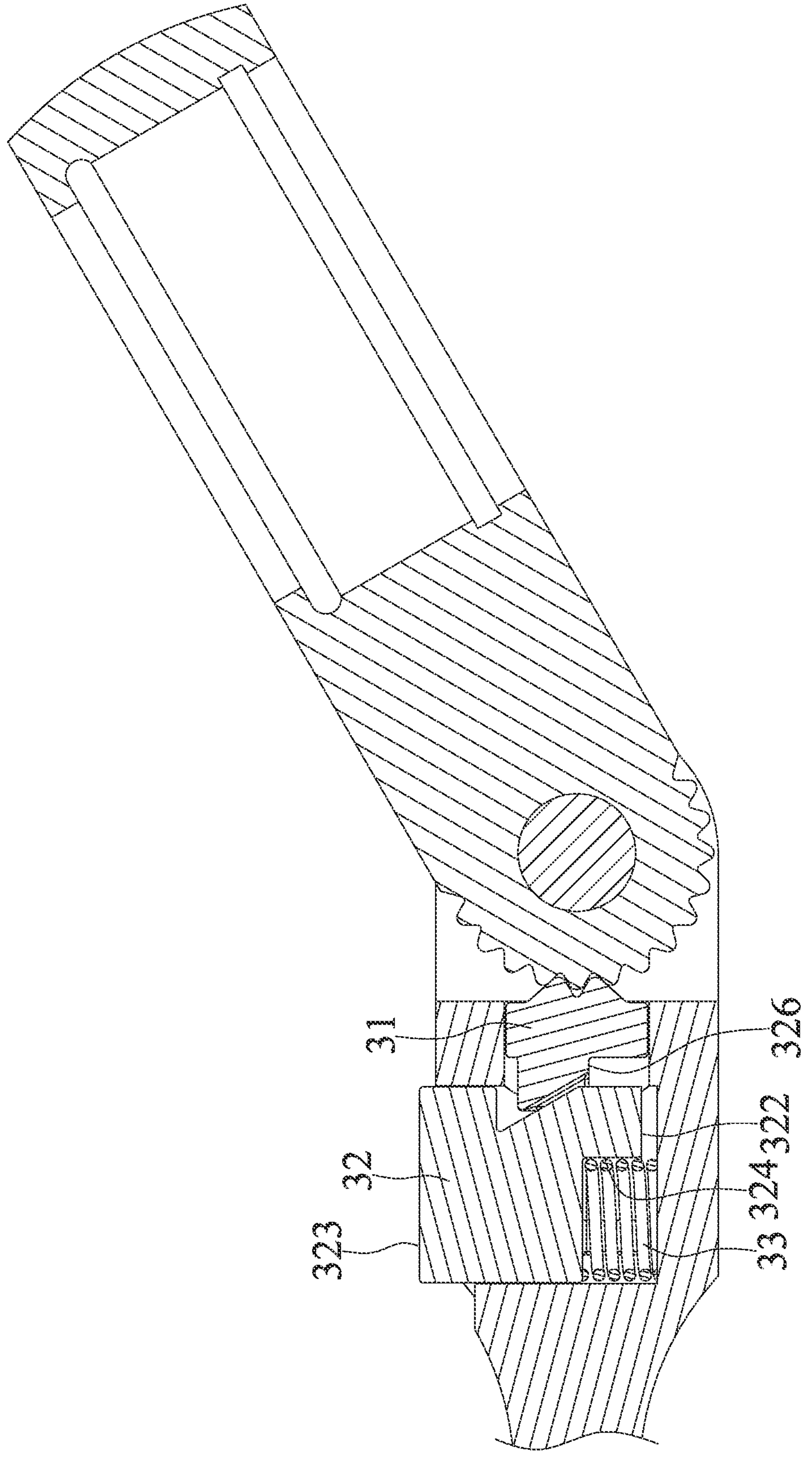
FIG. 7 is another cross-sectional view showing the head of the flex head tool of FIG. 1 retained in a different angular position from that of FIG. 4.

FIGS. 1 through 7 show a flex head tool 10 in accordance with the present invention. The flex head tool 10 has a structure 20 which includes a first body 21 and a second body 22 pivotally coupled to each other. The first body 21 has two lugs 213 and 214 and delimits a space 215 between the two lugs 213 and 214. The second body 22 has a coupling end 221 inserted into the space 215 and pivotally coupled with the two lugs 213 and 214. The lugs 213 and 214 respective define holes 216 and 217 and the coupling end 221 defines a hole 224 corresponding to the holes 216 and 217. The first and the second bodies 21 and 22 include a pivot 23 inserted into the holes 216, 224 and 217.

The body 21 defines a first orifice 211 and a second orifice 212 cooperatively receiving a retaining device 30 which is adapted to position the first body 21 with respect to the second body 22 at various angular positions. The first orifice 211 defines a first opening at a first end of the second body 22 and facing the first body 21, i.e. a first engaging structure 222 at the coupling end 221 of the first body 21. The first orifice 211 defines a second opening at a second end adjoining the second orifice 212. The second orifice 212 defines an opening at one of two opposite sides of the second body 22, which can respective define a top or a bottom of the second body. The first and the second orifices 211 and 212 extend in different directions. The second orifice 212 opens to and extends radially from the first orifice 211.

The retaining device 30 includes a retainer 31 having a second engaging structure 311 which selectively engages with different sections of the first engaging structure 222 such that the first body 21 is able to be fixed with respect to the second body 22 at different angular positions. The retainer 31 is movably disposed in the first orifice 211. The first engaging structure 222 includes a plurality of first teeth 223 and the second engaging structure 311 includes a plurality of second teeth 315, respectively. The plurality of second teeth 315 selectively engages with the plurality of first teeth 223 to restrain the first body 21 from moving with respect to the second body 22. The retainer 31 has a first side 313 and a second side 314 on opposite sides. The retainer 31 has a first and a second longitudinal length L1 and L2 extending in the same direction. The first longitudinal length L1 extends from a distal end of the retainer 31, i.e. the distal end of the second engaging structure 311, to a distal end of the first interacting structure 312. The second longitudinal length L2 extends from the distal end of the second engaging structure 311 to another distal end of the retainer 31, which is adjacent to the second side 314 of the retainer 31, and is shorter than the first longitudinal length L1. Particularly, the first and the second longitudinal lengths L1 and L2 extend from an apex of one of the plurality of teeth of the second engaging structure 311.

The retaining device 30 also includes an actuator 32 adapted to move the retainer 31 in a first position in which the first and the second engaging structures 222 and 311 are engaged with each other and a second position in which the first and the second engaging structures 222 and 311 are disengaged from each other. The actuator 32 is movably disposed in the orifice 212. The actuator 32 has a second interacting structure 321 abutting the first interacting structure 312 as it movably engages with the retainer 31. The second interacting structure 321 extends between a first end which is adjacent to the second opening of the first orifice 211 and a second end which is distal to the second opening of the first orifice 211. The first end of the second interacting structure 321 is adjacent to one of two opposite sides 322 and 323 of the actuator 32, i.e. 322, which is disposed adjacent to a closed end of the of the second orifice 212. The second end of the second interacting structure 321 is adjacent to the other of the two opposite sides 322 and 323, i.e. 323, which is disposed adjacent to the opening of the second orifice 212. The first interacting structure 312 slides on the second interacting structure 321 in response to the operation of the actuator 32. The actuator 32 is movable in the second orifice 212 in a first direction, i.e. toward the closed end of the second orifice 212, and a second direction opposite to the first direction, i.e. toward the opening of the second orifice 212. The second interacting structure 321 is at an end of the actuator 32 and has a first and a second position at which the first interacting structure 312 respectively abuts when the actuator 32 is at the first position and the second position. The first and the second positions of the second interacting structure 321 are at different distances from the end of the actuator 32. In addition, the second longitudinal length L2 extends from the distal end of the second engaging structure 311 to another distal end of the retainer 31, which is adjacent to the second position of the second interacting structure 321. The actuator 32 is adapted to be resiliently urged by a resilient member 33. The actuator 32 defines a recess 324 at an end thereof for receiving the resilient member 33. The recess 324 has an opening adjacent to the closed end of the second orifice 212, as well as the side 322 of the actuator 32. One end of the resilient member 33 is retained on a closed end of the recess 324. The retainer 31 is movable axially in the first orifice 211 toward the first engaging structure 222 when the actuator 32 moves in the first direction, and away from the engaging structure 222 when the actuator 32 moves in the second direction.

Further, one of the first and the second interacting structures 312 and 321 includes a rib 326 protruding therefrom and the other of the first and the second interacting structures 312 and 321 forms at least one projection, respectively. hi the embodiment, the first interacting structure 312 is in the form of a projection while the second interacting structure 32 is in the form of a surface and the surface includes a rib protruding therefrom. to the embodiment, the projection of the first interacting structure 31 is curved and abuts on the surface of the second interacting structure 321 tangentially, but not limited thereto. in the embodiment, the first interacting structure 312 is in the form of two projections which are disposed in a spaced relationship and the two projections delimit a cavity 316 therebetween. In the embodiment, the surface of the second interacting structure 321 is flat, but not limited thereto. Thus, when the retainer 31 and the actuator 32 are movably engaged with each other, the at least one projection of the first interacting structure 312 abuts the surface of the second interacting structure 321, and the rib 326 is inserted into the cavity 316 and held between the two projections. Accordingly, a retainer 31 can move on an actuator 32 or vice versa in a guided manner.

The foregoing is merely illustrative of the principles of this invention and various modifications can be made by those skilled in the art without departing from the scope and spirit of the invention.

What is claimed is:

1. A flex head tool comprising:

a first body and a second body pivotally coupled to the first body, wherein the first body defines a first orifice and a second orifice cooperatively receiving a retaining device which is adapted to position the first body with respect to the second body at various angular positions, wherein the retaining device includes a retainer movably disposed in the first orifice and an actuator movably disposed in the second orifice, wherein the second body has a first engaging structure and the retainer has a second engaging structure selectively engaging with different sections of the first engaging structure such that the first body is fixed with respect to the second body at different angular positions, wherein the actuator abuts the retainer and is movable between a first position in which the first and the second engaging structure are engaged with each other and a second position in which the first and the second engaging structures are disengaged from each other thereby allowing the first and the second bodies move relative to each other, wherein the retainer and the actuator respectively have a first interacting structure and a second interacting structure abutting each other, wherein the second interacting structure is at an end of the actuator and has a first and a second position at which the first interacting structure respectively abuts when the actuator is at the first position and the second position, and wherein the first and the second positions of the second interacting structure are at different distances from an end of the actuator;

wherein one of the first and the second interacting structures includes a rib protruding therefrom and the other of the first and the second interacting structures forms at least one projection respectively, and wherein the rib protrudes from a surface of one of the first and the second interacting structures on which the at least one projection of the other of the first and the second interacting structures abuts; and wherein the at least one projection of the other of the first and the second interacting structures includes two projections disposed in a spaced relationship, wherein the two projections delimit a cavity therebetween, and wherein the two projections of the other of the first and the second interacting structures abut the surface of one of the first and the second interacting structures, and wherein when the actuator is in the first position, the rib is in the cavity and held between opposite sides of the two projections, and wherein when the actuator is in the second position, the rib is in the cavity and held between opposite sides of the two projections.

2. The flex head tool as claimed in claim 1, wherein the first orifice defines a first opening at a first end of the second body and facing the first engaging structure, wherein the first orifice defines a second opening at a second end adjoining the second orifice, wherein the second orifice defines an opening at one of two opposite sides of the second body, and wherein the first and the second orifices extend in different directions.

3. The flex head tool as claimed in claim 1, wherein the retainer has a first and a second longitudinal length extending in the same direction, wherein the first longitudinal length extends from a distal end of the retainer to a distal end of the first interacting structure, and wherein the second longitudinal length extends from the distal end of the second engaging structure to another distal end of the retainer, which is adjacent to the second position of the second interacting structure, and is shorter than the first longitudinal length.

4. The flex head tool as claimed in claim 2, wherein the second interacting structure extends between a first end which is adjacent to the second opening of the first orifice and a second end which is distal to the second opening of the first orifice.

5. The flex head tool as claimed in claim 4, wherein the first end of the second interacting structure is adjacent to one of two opposite sides of the actuator which is disposed adjacent to a closed end of the of the second orifice, and wherein the second end of the second interacting structure is adjacent to the other of the two opposite sides which is disposed adjacent to the opening of the second orifice.

6. The flex head tool as claimed in claim 1, wherein the actuator is adapted to be resiliently urged by a resilient member.

7. The flex head tool as claimed in claim 6, wherein the actuator defines a recess at an end thereof for receiving the resilient member, and wherein one end of the resilient member is retained on a closed end of the recess.

8. The flex head tool as claimed in claim 1, wherein the at least one projection of the other of the first and the second interacting structures is curved and abuts on the surface of one of the first and the second interacting structures tangentially.

* * * * *